(12) United States Patent
Peterson et al.

(10) Patent No.: US 6,390,980 B1
(45) Date of Patent: May 21, 2002

(54) SPATIAL COMPOUNDING WITH ULTRASONIC DOPPLER SIGNAL INFORMATION

(75) Inventors: Roy B. Peterson, Seattle; Daniel C. Schmiesing, Granite Falls, both of WA (US); Thanasis Loupas, Athens (GR)

(73) Assignee: ATL Ultrasound, Inc., Bothell, WA (US)

( * ) Notice: Subject to any disclaimer, the term of this patent is extended or adjusted under 35 U.S.C. 154(b) by 0 days.

(21) Appl. No.: 09/435,118

(22) Filed: Nov. 5, 1999

Related U.S. Application Data
(60) Provisional application No. 60/111,314, filed on Dec. 7, 1998.

(51) Int. Cl.[7] ................................................ A61B 8/00
(52) U.S. Cl. ....................................... 600/443; 600/447
(58) Field of Search ................................. 600/443, 447, 600/444, 453, 455, 454; 125/916

(56) References Cited

U.S. PATENT DOCUMENTS

| | | | |
|---|---|---|---|
| 4,070,905 A | | 1/1978 | Kossoff |
| 4,159,462 A | | 6/1979 | Roca et al. |
| 4,649,927 A | | 3/1987 | Fehr et al. |
| 4,664,122 A | | 5/1987 | Yano |
| 4,682,497 A | | 7/1987 | Sasaki |
| 4,821,574 A | | 4/1989 | Takamizawa |
| 4,830,015 A | | 5/1989 | Okazaki |
| 4,888,694 A | | 12/1989 | Chesarek |
| 5,409,007 A | | 4/1995 | Saunders et al. |
| 5,485,842 A | | 1/1996 | Quistgaard |
| 5,566,674 A | | 10/1996 | Weng |
| 5,655,535 A | | 8/1997 | Friemel et al. |
| 5,709,209 A | * | 1/1998 | Friemel et al. ............. 600/443 |
| 5,718,229 A | | 2/1998 | Pesque et al. |
| 5,782,766 A | * | 7/1998 | Weng et al. ................ 128/916 |
| 5,908,390 A | | 6/1999 | Matsuchima |
| 6,117,081 A | * | 9/2000 | Jago et al. ................... 600/443 |
| 6,135,956 A | * | 10/2000 | Schmiesing et al. ........ 600/437 |
| 6,210,328 B1 | * | 4/2001 | Robinson et al. ........... 600/437 |

FOREIGN PATENT DOCUMENTS

| | | |
|---|---|---|
| DE | 198 19 794 A1 | 5/1998 |
| EP | 0 815 793 A2 | 6/1997 |
| EP | 0 844 496 A2 | 11/1997 |

OTHER PUBLICATIONS

Rohling et al., "Three–dimensional spatial compounding of ultrasound images," Medical Image Analysis (1996/7) vol. 1, No. 3, pp. 177–193, Oxford University.

Moskalik et al., "Registration of Three–dimensional Compound Ultrasound Scans of the Breast for Refraction and Motion Correction," Ultrasound in Med. & Biol. vol. 21, No. 6, pp. 769–778, 1995.

Rohling et al., "Automatic Registration of 3–D Ultrasound Images," Ultrasound in Med. & Biol., vol. 24, No. 6, pp. 841–854, 1998.

Feigenbaum, Echocardiography, Lea & Febiger, 1976 at pp. 32–34, Philadelphia, PA.

(List continued on next page.)

Primary Examiner—Francis J. Jaworski
Assistant Examiner—Maulin Patel
(74) Attorney, Agent, or Firm—W. Brinton Yorks, Jr.

(57) ABSTRACT

An ultrasonic diagnostic imaging system and method are described which perform spatial compounding of tissue motion or flow information. The resultant images not only reduce speckle artifacts, but also reduce dropout caused by the angular dependence of Doppler information. Compound images may be formed using both B mode and Doppler information acquired in a time interleaved manner, either one or both of which may be spatially compounded. The techniques of the present invention may be employed to reduce multiline artifacts and to produce real time compound images at high frame rates of display.

53 Claims, 8 Drawing Sheets

OTHER PUBLICATIONS

Carpenter et al., Technical Note—A Multimode Real Time Scanner, Ultrsound in Med. & Biol., vol. 6, pp. 279–284, Pergamon Press Ltd. 1980, Great Britain.

Berson et al., Compound Scanning With a Electrically Steered Beam Ultrasonic Imaging 3, pp. 303–308, Academic Press, Inc. 1981.

Shattuck et al., Compound Scanning With a Phased Array, Ultrasonic Imaging 4, pp. 93–107, Academic Press, Inc. 1982.

Jesperson et al., Multi–Angle Compound Imaging, Ultrasonic Imaging 20, pp. 81–102, Dynamedia, Inc. 1998.

* cited by examiner-

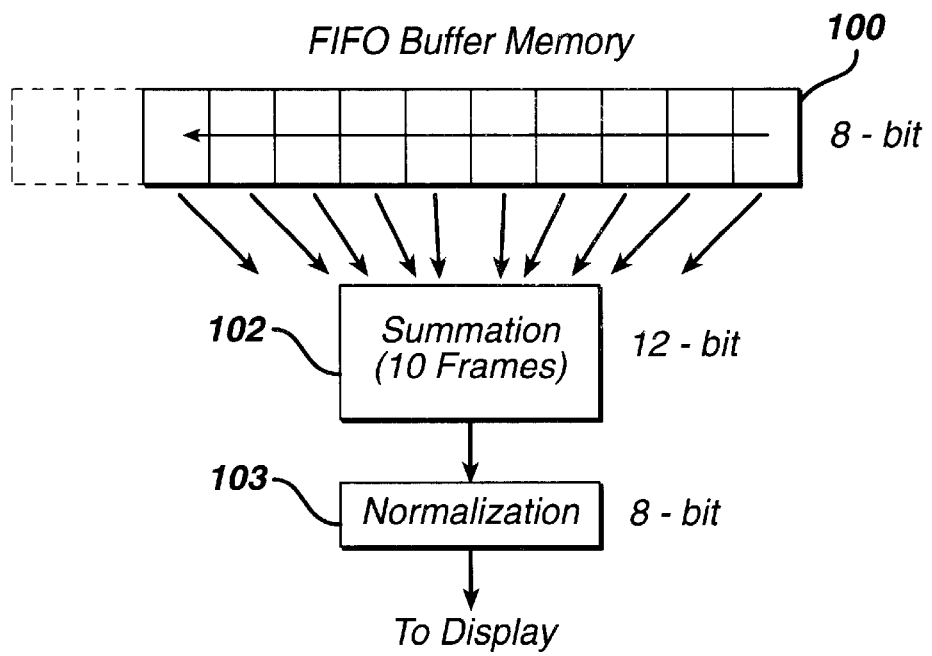
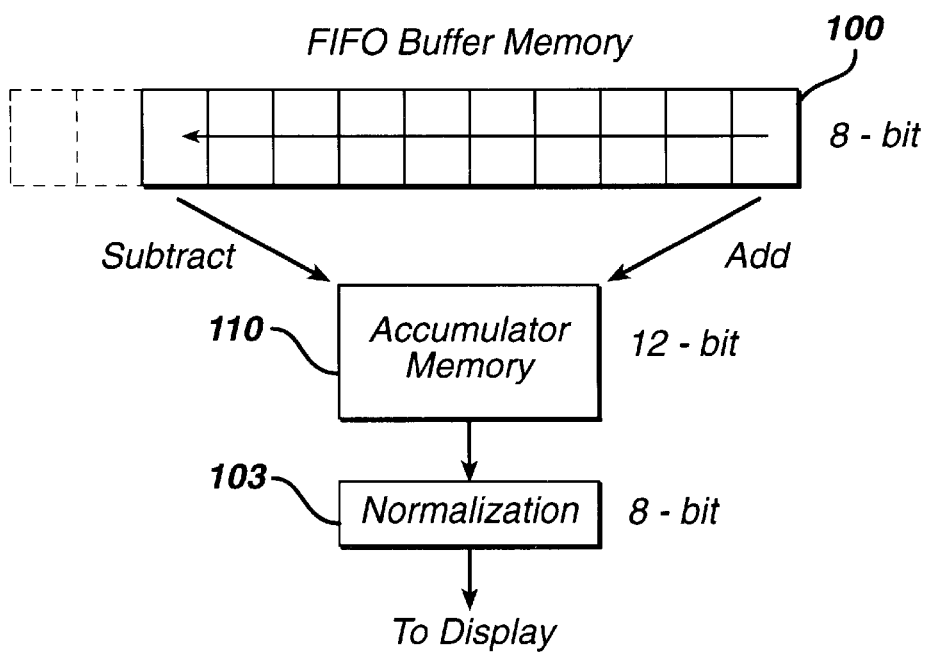

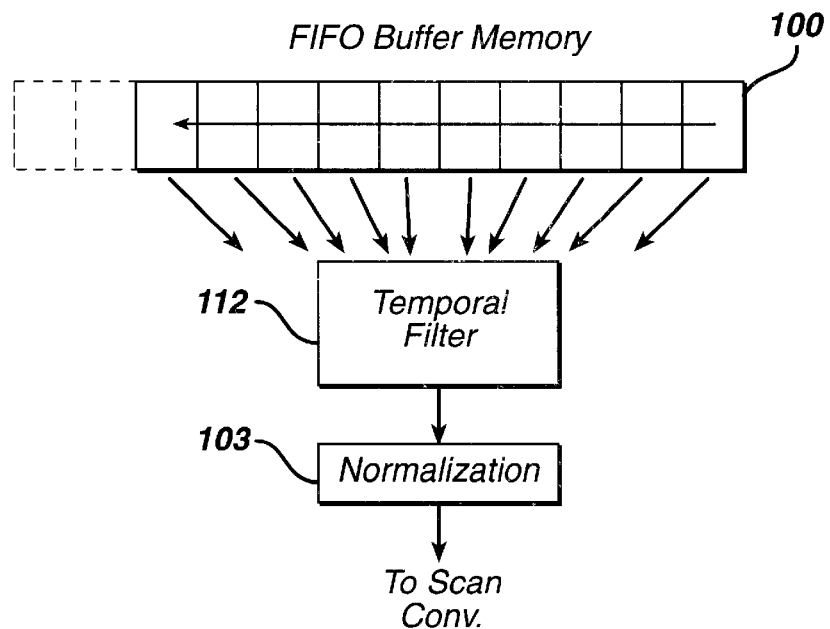
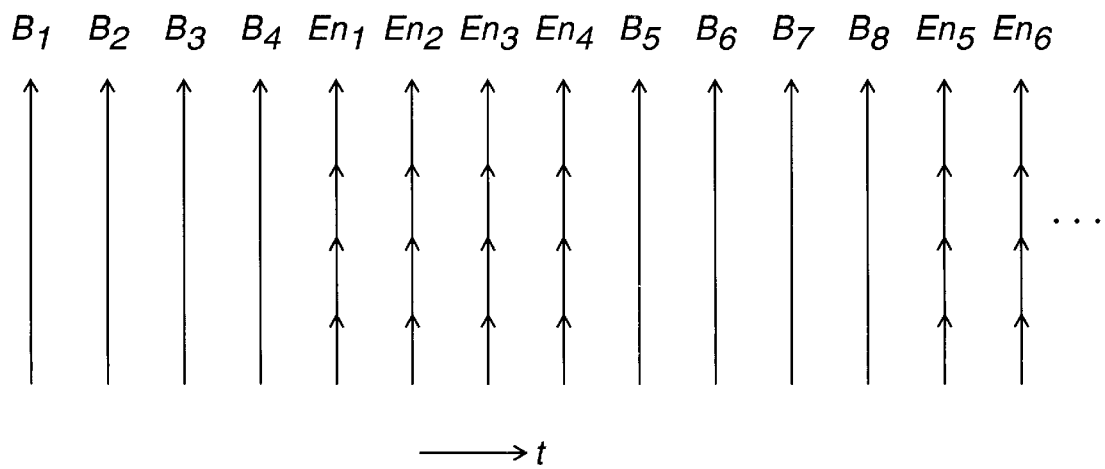

SPATIAL COMPOUNDING WITH ULTRASONIC DOPPLER SIGNAL INFORMATION

This application claims the benefit of Provisional U.S. Patent Application Ser. No. 60/111,314, filed Dec. 7, 1998.

This invention relates to ultrasonic diagnostic imaging systems and, in particular, to ultrasonic diagnostic imaging systems which produce spatially compounded images of moving tissue and/or flow information.

Pending U.S. patent applications Ser. No. 09/335,058, 09/335,159 and 09/335,160 describe apparatus and methods for performing real time spatial compounding of ultrasonic diagnostic image information. Spatial compounding is an imaging technique in which a number of ultrasound images of a given target that have been obtained from multiple vantage points or angles (look directions) are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component image frames from substantially independent spatial directions, utilizing an array transducer to implement electronic beam steering and/or electronic translation of the component frames. The component frames are combined into a compound image by summation, averaging, peak detection, or other combinational means. The acquisition sequence and formation of compound images are repeated continuously at a rate limited by the acquisition frame rate, that is, the time required to acquire the full complement of scanlines over the selected width and depth of imaging.

The compounded image typically exhibits reduced speckle artifacts and improved delineation of specular reflector interfaces as compared to conventional ultrasound images from a single viewpoint. While these advantages may be readily obtained in the compounding of B mode images, it would be desirable to obtain the same advantages for Doppler imaging. Moreover, the use of different look directions for the component images which are compounded offers the prospect of overcoming a limiting characteristic of Doppler imaging. Doppler signals characteristically have a strong angle dependence. Flow or motion parallel to the transmit beam returns a large Doppler shift, whereas flow or motion orthogonal to the transmit beam provide no Doppler shift. Due to the use of a wall filter the strength of the Doppler signal varies between these extremes. In power Doppler imaging, for instance, where it is desired to image the intensity of the Doppler signal, the clinician cannot be certain that he is observing variation in motion or flow or simply a manifestation of this angle dependence of the Doppler signal. It is desirable to reduce this uncertainty so that more sensitive power Doppler images and more accurate velocity Doppler images can be provided, in addition to providing the aforementioned benefits of compound imaging.

In accordance with the principles of the present invention, Doppler signals are acquired from a number of different look directions and are processed to form real time spatially compounded ultrasonic Doppler images. The Doppler compound imaging technique can be applied to power Doppler or velocity Doppler (colorflow) imaging of either bloodflow or tissue motion. In an illustrated embodiment Doppler image frames are compounded by temporal filtering in estimate space, then converted to the desired display format in display space. The spatially compounded Doppler image may be acquired in an interleaved manner, and combined for display with a spatially compounded or non-compounded B mode image.

In the drawings:

FIG. 3 illustrates in block diagram form a spatial compounding processor with frame memories and compound image accumulator constructed in accordance with the principles of the present invention;

FIG. 4 illustrates in block diagram form a second Doppler spatial compounding processor of the present invention using an accumulator which operates upon partially summed compound images.

FIG. 6 illustrates in block diagram form another embodiment of the present invention which uses a temporal filter for image compounding;

FIG. 7 illustrates an image acquisition sequence of time interleaved B mode and Doppler image lines;

FIG. 1 illustrates in block diagram form an ultrasonic diagnostic imaging system which performs Doppler and/or B mode spatial compounding in accordance with the principles of the present invention. A scanhead 10 including an array transducer 12 transmits beams at different angles over an image field as denoted by the dashed rectangle C and parallelograms A and B.

Figure 1:
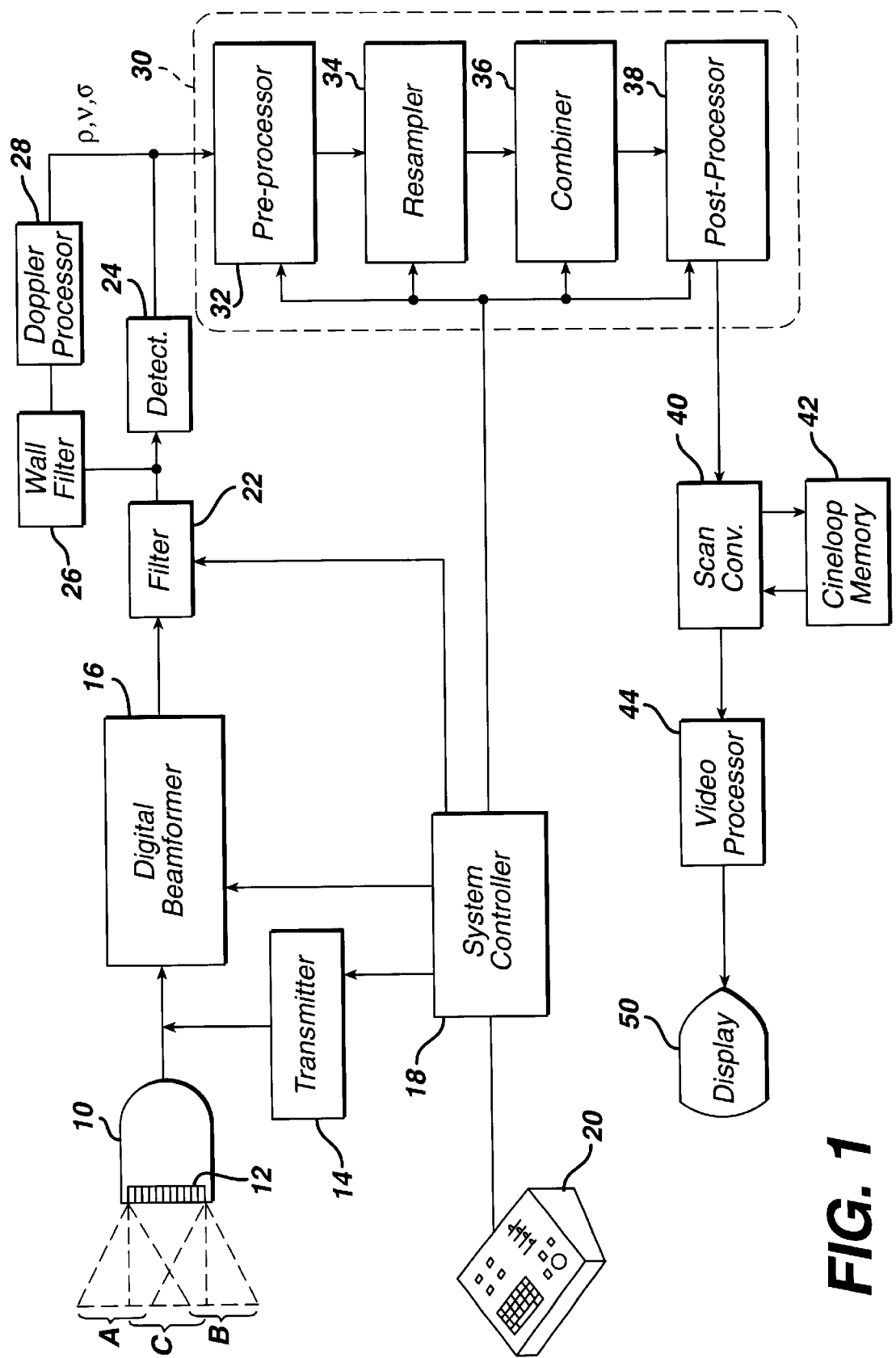
FIG. 1 illustrates in block diagram form an ultrasonic diagnostic imaging system constructed in accordance with the principles of the present invention.

Three groups of scanlines are indicated in the drawing and denoted by A, B, and C with the scanlines of each group being steered at a different angle relative to the scanhead. The transmission of the beams is controlled by a transmitter 14 which controls the phasing and time of actuation of each of the elements of the array transducer so as to transmit each beam from a predetermined origin along the array and at a predetermined angle or steering direction, and focus. The echoes returned from along each scanline are received by the elements of the array, digitized as by analog to digital conversion (not shown), and coupled to a digital beamformer 16. The digital beamformer delays and sums the echoes from the array elements to form a sequence of focused, coherent digital echo samples along each scanline. The transmitter 14 and beamformer 16 are operated under control of a system controller 18, which in turn is responsive to the settings of controls of a user interface 20 operated by the user of the ultrasound system. The system controller controls the transmitter to transmit the desired number of scanline groups at the desired angles, focuses, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. For fundamental frequency imaging the fundamental frequency band is passed, and the two bands may be separated and passed for blended harmonic and fundamental frequency imaging.

Harmonic frequency separation may also be performed by the technique known as pulse inversion and described in U.S. Pat. Nos. 5,706,819 and 5,951,478. The filtered signals are then detected by a detector 24 for B mode imaging and/or coupled to a wall filter 26 for Doppler imaging. In a preferred embodiment the filter 22 and detector 24 include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging the received signals first undergo wall filtering to pass desired Doppler signals and reject undesired signals, such as undesired signals from slow moving or stationary tissue when imaging bloodflow. When tissue motion is to be Doppler imaged, the wall filter may be set to reject only stationary tissue signals or the wall filter may be bypassed entirely with the system gain or sensitivity set to emphasize signals of greater amplitude. In a preferred embodiment wall filtering is performed by a mathematical matrix operation to reduce tissue motion effects when flow is being image or flow effects when moving tissue is being imaged. Ensembles of echoes are assembled for each point in the image and are Doppler processed by a Doppler processor 28 to produce estimates of the Doppler shift, Doppler power intensity p, velocity v or variance σ.

In accordance with the principles of the present invention the Doppler and/or B mode signals are processed by spatial compounding in a processor 30. The signals applied to processor 30 are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling process in a resampler 34. Because the signal samples of each component frame are acquired from different look (steering) directions, the samples of the component frames, when overlaid, will generally not be in exact spatial registration with each other. The resampler 34 can spatially realign the estimates of each component frame to a common estimate sample spatial reference in which the component frames are compounded. The resampler can also effect scan conversion by resampling the data in the desired display orientation.

After resampling the image frames are compounded by a combiner 36. Combining may comprise summation, averaging, peak detection, temporal filtering, or other combinational means. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image. It may be desirable to employ spatially varying compression, with the range of compression varying as a function of the number of look directions being compounded at a particular point in the image.

The compounding process may be performed in estimate data space or in display pixel space. In a preferred embodiment spatial compounding is done with estimate space data, and the compounded image data is then coupled to a scan converter 40 which converts the data to display space data of the desired image format. The compound images may be stored in a Cineloop® memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924. Following scan conversion B mode and Doppler images which are temporally proximal and of substantially the same image field may be overlaid to form an image of both compounded B mode image information and compounded Doppler image information. A Doppler image may also be combined with a non spatially compounded B mode image, which can result in a greater frame rate of display. The spatially compounded images, Doppler, B mode, or combined, are processed for display by a video processor 44 and displayed on an image display 50.

Since ultrasound signals acquired from different look directions will exhibit different speckle patterns, the combining of signals from different look directions will reduce image speckle artifacts. The different look directions will also provide better delineation of interfaces and boundaries, since no boundary or interface in the image will be viewed from only a tangential direction. Furthermore, Doppler and colorflow imaging are known to have an angle dependence between the ultrasound beam and the velocity of flow. This is represented well in the Doppler equation:

$$f_D = 2vf_o \cos \theta / c$$

where the Doppler frequency shift $f_D$ is determined from the Doppler phase shift by $$f_D = \phi_D \frac{PRF}{2\pi},$$

the PRF is the transmit pulse repetition frequency, and the Doppler phase shift $\phi_D$ may be determined from complex echo signal samples generated by a Hilbert transform or quadrature bandpass filtering. In a preferred embodiment complex echo samples of the form I+jQ undergo autocorrelation to produce echo data of the form I'+jQ' which are then used to compute the Doppler shift by $$\phi_D = \tan^{-1} \frac{Q'}{I'}.$$

The Doppler shift, $f_D$, is proportional to the velocity, v, the center frequency, $f_o$, and the cosine of the angle θ between the ultrasound beam and direction of blood flow. As the angle increases, that is, the direction of blood flow or tissue motion is more perpendicular to the beam, the Doppler shift decreases. When it is fully perpendicular the mean Doppler shift frequency is zero. In an embodiment of the present invention in which flow or motion is viewed from different look directions, this zero dropout of the Doppler signal is prevented since flow or motion is always viewed from more than one angle.

Figure 2:
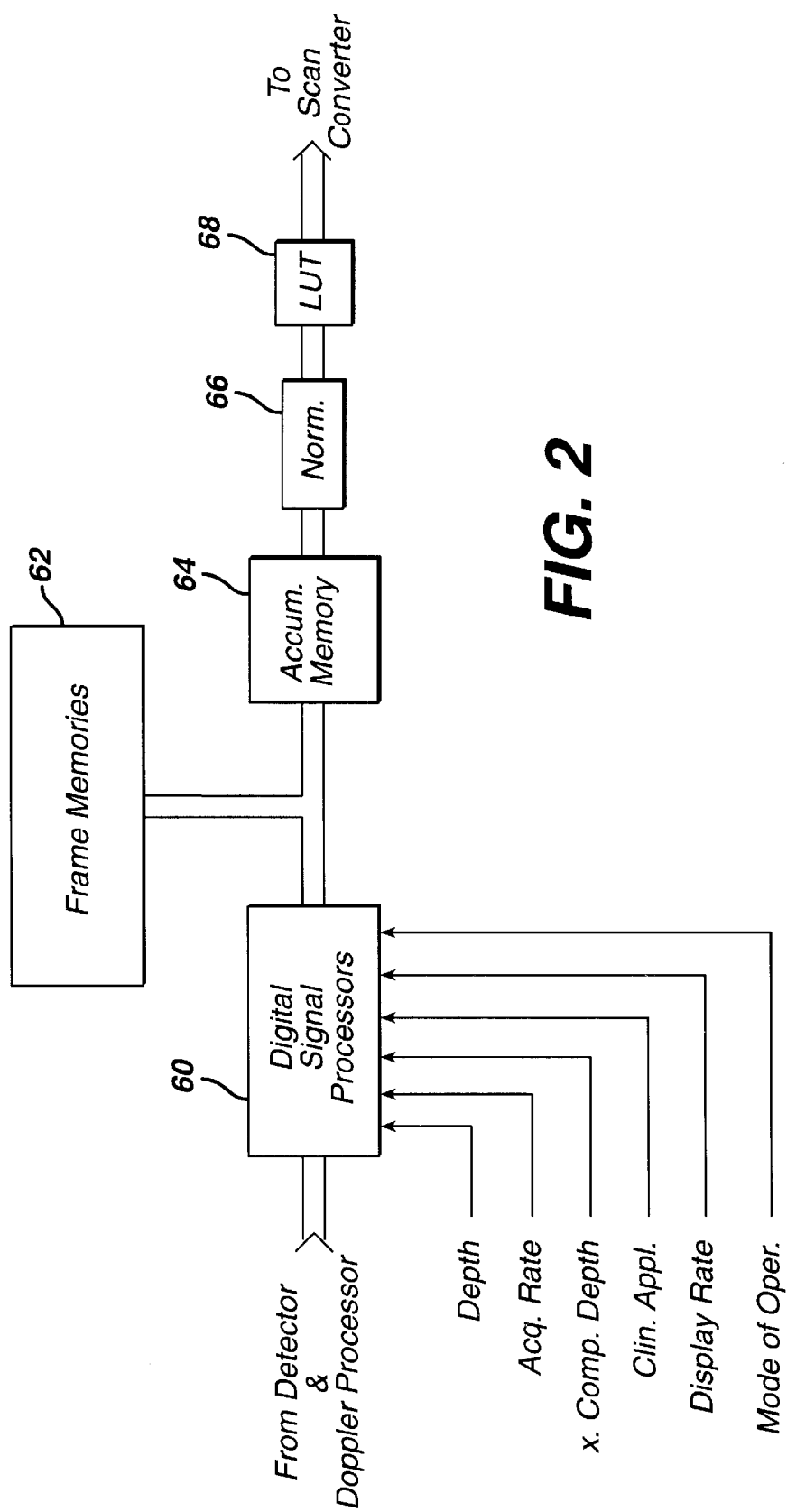
FIG. 2 illustrates in block diagram form a preferred implementation of the spatial compounding processor of FIG. 1.

FIG. 2 illustrates a preferred implementation of the spatial compounding processor 30 of FIG. 1. The processor 30 is preferably implemented by one or more digital signal processors 60 which process the image data in various ways. The digital signal processors 60 can weight the received image data and can resample the image data to spatially align pixels from look direction to look direction or frame to frame, for instance. The digital signal processors 60 direct the processed image frames to a plurality of frame memories 62 which buffer the individual image frames. The number of image frames capable of being stored by the frame memories 62 is preferably at least equal to the maximum number of image frames to be compounded such as sixteen frames. In accordance with the principles of the present invention, the digital signal processors are responsive to control parameters including image display depth, depth of region of greatest compounding, clinical application, compound display rate, mode of operation, and acquisition rate for determining the number of images to compound at a given instant in time. The digital signal processors select component frames stored in the frame memories 62 for assembly as a compound image in accumulator memory 64. The compounded image formed in the accumulator memory 64 is weighted or mapped by a normalization circuit 66, then compressed to the desired number of display bits and, if desired, remapped by a lookup table (LUT) 68. The fully processed compounded image is then transmitted to the scan converter for formatting and display.

One approach to implementing spatial compounding is to use a large FIFO memory buffer 100 to temporarily store the component image frames that will be compounded (typically by averaging, i.e., summing 102 and normalization 103) to form the final compounded image, as shown in FIG. 3. For example, if the acquired images are 512 pixels×512 pixels×1 byte and there are 10 images to be compounded, the buffer memory 100 would need to have a capacity of 2.5 megabytes. For real-time spatial compounding, where the compounded frames are generated either at the acquisition frame rate or at the display frame rate, the hardware that is performing the compounding must have sufficient bandwidth to access all of the frames in this buffer memory at the compounded frame rate, as well as have sufficient processing power to sum all of the frames and normalize the compounded frame at this rate. To proceed with the example above, if the required compounded frame rate is 60 Hz, the compound image processor would need a data bandwidth of at least 150 megabytes per second and would need to perform at least $150 \times 10^6$ multiply/accumulate operations per second.

In accordance with one aspect of the present invention, a compound image processor is provided which considerably reduces the bandwidth and processing requirements imposed on the processor. A first embodiment of the present invention is obtained by considering the summation involved in averaging to be a linear and associative (FIR) filtering operation. In FIG. 4 an accumulator memory 110, which preferably has sufficient bit depth to preserve the full precision of the compounded image (e.g., 12 bits in this example), is initialized by summing the first N frames (where N is the number of component frames to be compounded). Subsequent compounded images are obtained by subtracting the oldest acquired frame (i.e. N−1 frames before the current frame, on the left of the FIFO in the drawing) from the summed framed in the accumulator memory 110 and adding the newest (most current) frame (on the right of the FIFO in the drawing) to the accumulator memory. The normalization 103 can be performed either on the input component frames before summation or on the summed image as it is read from the accumulator memory 110, prior to sending it on to other operations such as subsequent image processing or display.

In the example given above with 10 frames being compounded at a rate of 60 Hz, the data bandwidth required would be that needed to access the current frame and the oldest frame (i.e. N frames previous to the current frame) from the FIFO buffer memory 100, i.e., 30 megabytes per second, while the number of operations is that required to add and subtract these frames from the accumulator memory 110, i.e., approximately $30 \times 10^6$ multiply/accumulate operations per second. One of the advantages of this approach is that the bandwidth and processing requirements are independent of the number of component frames to be compounded—they depend only on the compounded frame rate. The extra memory required for the accumulator memory 110 would be 512×512×2 bytes, or 0.5 megabytes, which provides sufficient precision for up to 256 compounded frames.

One disadvantage of this approach is that the compounding operation is limited to operations that are linear and associative, such as addition and multiplication. Other operations, such as peak detection or median filtering, which do not follow linear combinatorial rules would not be possible with this embodiment. However, these operations would be possible with the conventional compounding approach described in FIG. 3.

A second embodiment of the present invention, which further reduces the data bandwidth requirements, is possible if the output frame rate (i.e., the rate at which compounded images are generated) is substantially lower than the acquisition frame rate (i.e., the rate at which component images are acquired). This is a reasonable assumption when one considers that, if the compounded frames are generated at the acquisition rate, each compounded frame shares N−1 acquired frames in common with the previous compounded frame. In other words, there is typically a great deal of inherent persistence in real-time spatial compounding, the amount of persistence being directly proportional to the number of frames being compounded. Thus, to minimize the effects of motion induced blurring, it is desirable to maintain the highest possible acquisition rate. However, it may not be necessary to generate compounded images at the acquisition rate, bearing in mind the high temporal correlation between successive frames and the fact that the display rate may be lower than the acquisition rate.

Figure 5:
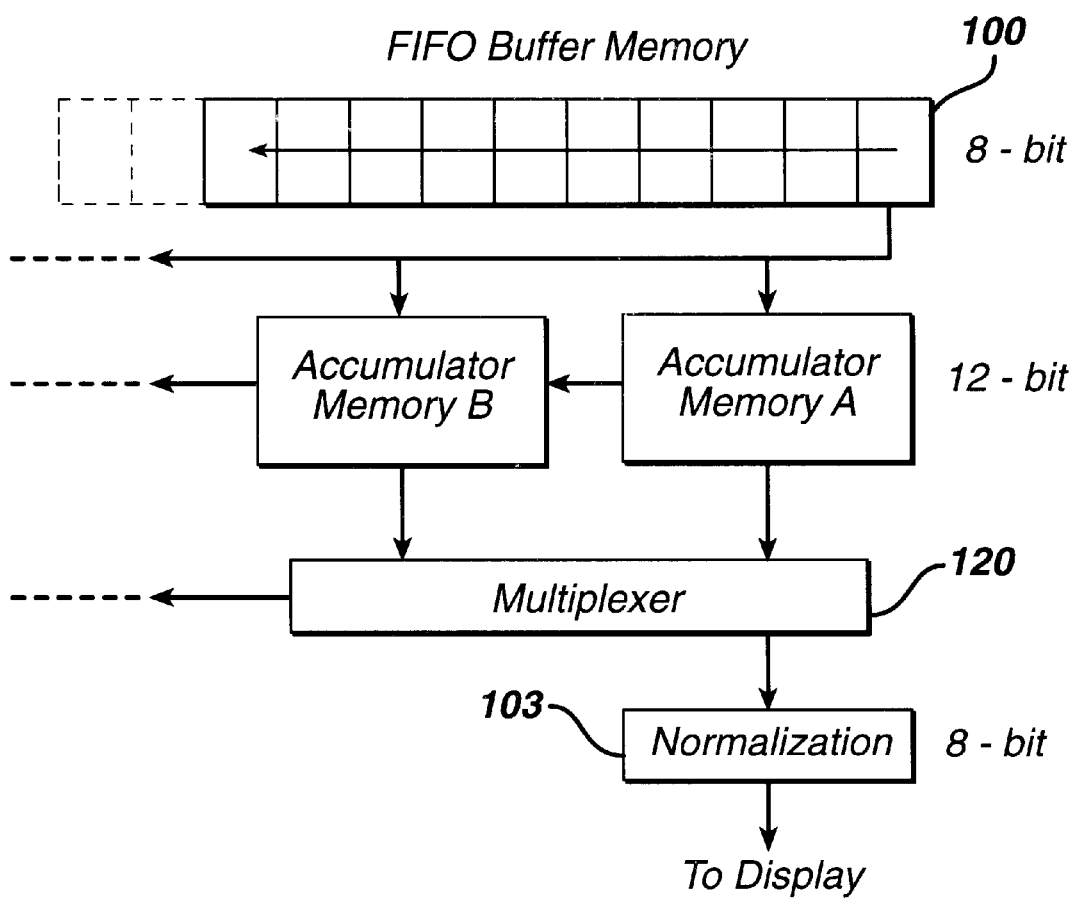
FIG. 5 illustrates in block diagram form another embodiment of the present invention which uses multiple accumulators to simultaneously process multiple compound images.

FIG. 5 shows a second embodiment of the present invention using two (or more) accumulator memories A and B, where the output (display) frame rate is always a factor of CEIL(N/M) lower than the acquired frame rate, where N is again the number of component frames being compounded and M is the number of accumulators. The accumulator memories A and B are used to generate compounded images in a ping-pong fashion. For the case of two accumulators, memory A is initialized first by summing the first N frames, while memory B does not start accumulating until the (CEIL(N/2)+1) frame has been reached. Subsequently, each accumulator memory makes its compounded image available to a multiplexer 120 as soon as N consecutive frames have been summed. The accumulator memory is then immediately cleared before beginning a new accumulation of component frames. Since the accumulator memories are cleared for the averaging method of compounding, there is no need in this method to subtract the oldest acquired frames from the accumulated sum of frames in the memory—it is only necessary to add the newest frame to both accumulators. Furthermore, it is not necessary to have separate buffer memories for storage of the component frames, as there is no need to save component frames for subsequent subtraction. Thus, this embodiment can reduce the image buffer requirements of the ultrasound system. The multiplexer chooses the most recently accumulated compound image to be sent on for normalization 103 and display.

Using the previous example, an acquisition rate of 60 Hz with 10 compounded frames gives; with two accumulators, an output rate of 60/CEIL(10/2)=12 Hz. The data bandwidth needed to the FIFO is now only 15 megabytes per second, while the two accumulator memories require 1 megabyte (again using 16-bit precision) of memory and $30 \times 10^6$ operations per second, the same as the previous embodiment. Although the output of both accumulator memories must be normalized, this can now be done at the output rate of 12 Hz for a total of approximately $6 \times 10^6$ operations per second, thus representing overall a 500% reduction in normalization processing requirements compared to the first embodiment. Another advantage of this method is that the compounding operator need no longer be associative (it still needs to be linear), so that operations such as peak detection are now possible.

Like the first embodiment, the memory and processing requirements of this second embodiment are independent of the number of frames being compounded. However, higher output rates can be achieved by adding accumulators as indicated in FIG. 5 by the dashed lines, with a concurrent increase in processing requirements.

Yet another alternative for compounding component images is to employ a recursive IIR filter architecture. The recursive feedback of some fraction of the compounded data provides a controllable persistence in the compound image. The IIR filter can be constructed as an image accumulator having two sources of input data, one being new component image data and the other being a weighted portion of the compounded image data produced by the accumulator.

Power Doppler, which is an estimate of the intensity of the Doppler signal, (also know as "color power angio", or CPA) is known to be less sensitive to the Doppler angle θ because it displays the power of the Doppler signal after wall filtering. Even when the angle is 90 degrees some power may pass through the wall filter and be displayed, due to spectral broadening induced by the finite interrogating aperture. Nonetheless, sensitivity is reduced because the wall filter will suppress most of the signal at a zero Doppler shift frequency. This is particularly undesirable in slow flow and deep flow applications where sensitivity is already compromised due to other factors.

The present invention improves the sensitivity of CPA to flow perpendicular or nearly perpendicular to the ultrasound beam and thus reduces the angle dependent sensitivity of CPA to flow. In accordance with the principles of the present invention, the concepts of spatial compounding are applied to CPA. Each successive CPA frame is acquired from a different angle or look direction A, B, C, etc. The frames are then compounded (averaged) to yield a display frame. In this way, if there is flow perpendicular to one interrogating beam direction it will not be perpendicular to other interrogating directions, For example, consider a linear array with 3 steering directions, 110°, 90°, and 70° degrees to the face of the transducer. The frame sequence would be as follows: B $C_{70}$ B $C_{90}$ B $C_{110}$ B $C_{70}$ B $C_{90}$ B $C_{110}$ B $C_{70}$ B $C_{90}$ B . . . where B is a B mode frame, and $C_S$ is a color (Doppler) frame steered at S degrees. This sequence of scan frames is shown in FIG. 1.

Conventional CPA processing is applied to each of the frames. That is, wall filtering and ensemble Doppler power estimation are performed on the received Doppler echo signals. The first step in compounding is to resample the 3 frames to a common spatial sampling grid. With the samples from the different look directions in registration with each other, the estimates are low pass filtered in the frame time (temporal) dimension. The embodiment of FIG. 6 illustrates this arrangement, in which the component frames stored in the buffer memory 100 are applied to a temporal filter 112 for combining. The use of a simple average or low pass filter for the temporal filter 112 will provide this function, as it does in conventional CPA. However, if there is flow perpendicular to one of the frame steering directions, that frame will unnecessarily bias the result to a lower value compromising sensitivity. A median filter or min-max filter preceding the linear low pass filter will improve sensitivity. The median or min-max filter removes peaks from flash artifact and zeros from perpendicular vessels. See U.S. Pat. No. 5,782,769 for an example of a suitable min-max filter.

The B mode images which overlay and thus frame the Doppler information can also be acquired and displayed by spatial compounding, depending on the desired frame rate of display. FIG. 7 illustrates an acquisition sequence for an image frame of a given look direction which comprises both B mode and Doppler information. In this sequence groups of B mode scanlines and Doppler ensembles are alternately acquired in a time interleaved manner. In this example four B mode scanlines $B_1$, $B_2$, $B_3$ and $B_4$ are acquired, followed by Doppler ensemble acquisition at the same spatial locations, $En_1$, $En_2$, $En_3$ and $En_4$. Each Doppler ensemble is represented by four aligned arrows, representing an ensemble acquired from four Doppler pulse transmissions. Each complete Doppler ensemble can be acquired in sequence, or samples from the different ensembles can be acquired in a time interleaved manner, that is, $En_1$, can be interrogated by one Doppler pulse, followed by single pulse interrogations of $En_2$, $En_3$ and $En_4$. Then ensembles $En_1$, $En_2$, $En_3$ and $En_4$ are each interrogated with a second pulse, and so forth. The time between the pulses of each ensemble is the PRI, or pulse repetition interval. Following the acquisition of the first group of Doppler ensembles B mode acquisition resumes with scanlines $B_5$, $B_6$, $B_7$, and $B_8$, followed by another group of ensembles $En_5$, $En_6$, and so forth.

The sequence of FIG. 7 represents that of a single component frame with each scanline, B mode and Doppler, acquired at the same look direction. After a component frame of one look direction is acquired, subsequent component frames are acquired at successively different look directions. An alternative to this frame interleave approach is to acquire echoes at the different look directions in a line interleave fashion rather than frame interleave. This can provide higher frame rates (1 echo ray for each 3 steered color rays when only Doppler information is being compounded versus 3 echoes rays for every 3 steered color rays when both B mode and Doppler information are compounded), and improved temporal correlation between steered rays (which is especially beneficial for vector Doppler). There are thus eight acquisition parameters which can be time interleaved:

B mode frame

B mode look direction

B mode line number (origin along the transducer)

Doppler frame

Doppler look direction

Doppler line number (origin along the transducer)
Doppler ensembles
Doppler transmit pulses The frame rate of an image formed by the acquisition sequence of FIG. 7 will be a function of the time required to acquire all of B mode scanlines and Doppler ensembles for one frame or look direction. The frame rate can be improved by using at least some of the acquired scanlines for both B mode and Doppler imaging as described in U.S. patent [application Ser. No. ATL-194].

Figure 8A:
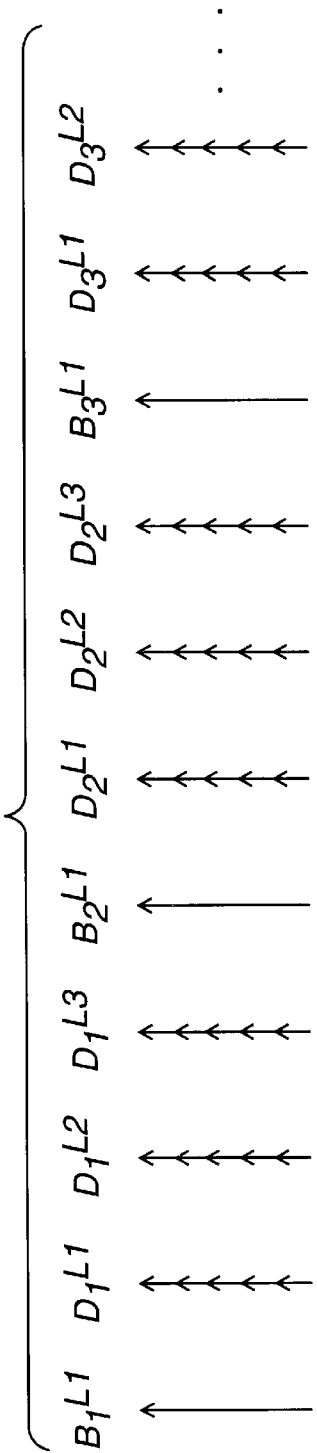
FIGS. 8a and 8b illustrate an image acquisition sequence of time interleaved Doppler and B mode scanlines of different look directions.

FIG. 8a illustrates an interleaved line acquisition sequence for the compounding of Doppler information but not B mode information. This sequence is useful when the Doppler information is the focus of the ultrasound exam and the surrounding B mode information is only of secondary importance, or when good temporal correlation of the Doppler information is desired. $B_1^{\angle 1}$ represents the acquisition of B mode line number 1 at a first look direction ($\angle 1$). The B mode line is followed by the acquisition of three Doppler ensembles $D_1^{\angle 1}$, $D_1^{\angle 2}$ and $D_1^{\angle 3}$, all originating from origin position 1 along the transducer, and each steered in a different look direction ($\angle 1$, $\angle 2$ and $\angle 3$). The five arrows of each ensemble represent an ensemble of five Doppler samples at each sample volume. The first set of Doppler ensembles are followed by a second B mode line $B_2^{\angle 2}$ originating at a second location along the transducer and steered in the same look direction ($\angle 1$) as the first B mode line. This is followed by the acquisition of another set of Doppler ensembles, $D_2^{\angle 1}$, $D_2^{\angle 2}$ and $D_2^{\angle 3}$, in the three look directions ($\angle 1$, $\angle 2$ and $\angle 3$) but originating at the second location along the transducer. The acquisition then continues to the third location along the transducer and repeats in the same manner.

Figure 8B:
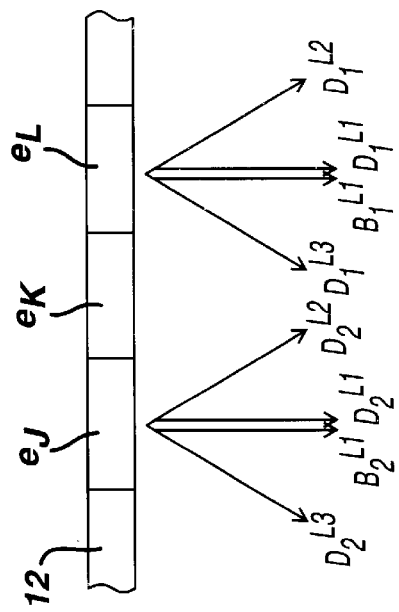

A spatial representation of this acquisition sequence from the perspective of a transducer array 12 including elements $e_J$, $e_K$, and $e_L$ is shown in FIG. 8b. A B mode line $B_1^{\angle 1}$ and three Doppler ensembles $D_1^{\angle 1}$, $D_1^{\angle 2}$ and $D_1^{\angle 3}$ all originate from the location of transducer element $e_L$. Similarly, a second B mode line $B_2^{\angle 1}$ and three Doppler ensembles $D_2^{\angle 1}$, $D_2^{\angle 2}$ and $D_2^{\angle 3}$ all originate from the location of transducer element $e_J$. The Doppler ensembles may be acquired successively or in a time interleaved manner. The data from the differing Doppler look directions are then spatially compounded and the compounded Doppler image is displayed framed by the uncompounded B mode image. If B mode lines are acquired from additional look directions, the B mode look directions can be spatially compounded as well.

Taking this concept a step further, if the flow or tissue motion which results in the Doppler signals has sufficiently low acceleration, vector Doppler (colorflow) can be performed using this acquisition sequence or the B-$C_{S1}$-B-$C_{S2}$ frame sequencing scheme described above. The measured Doppler shift components from each of the steered scanlines or frames are used to triangulate the true velocity vector at each point in the image. This technique is particularly useful for tissue Doppler imaging with vector Doppler, whereby the velocity of moving tissue is displayed. This is because moving tissue generally exhibits relatively high signal strength, enabling shorter ensemble lengths and higher frame rates than are practical with blood flow. Additionally, the relatively low velocities and low acceleration of moving tissue aid in retention of the image-to-image correlation necessary for spatial compounding. The technique is also well suited for power motion imaging as described in U.S. Pat. No. 5,718,229.

Figure 9:
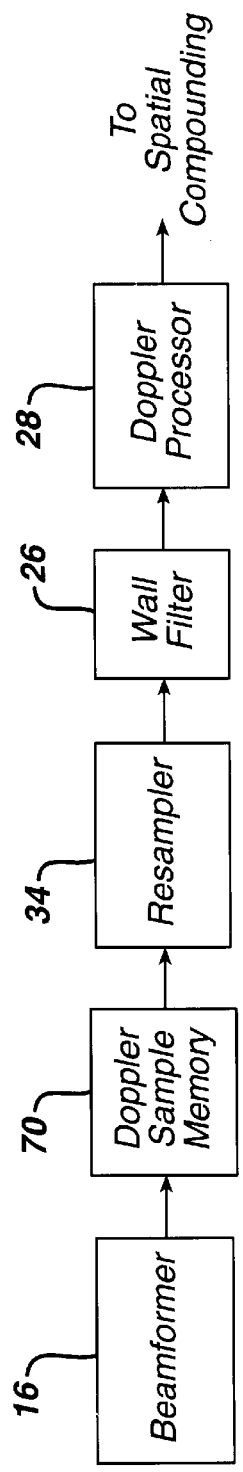
FIG. 9 illustrates a processing sequence for resampling Doppler signals prior to Doppler processing.

FIG. 1 shows the resampler 34 used to spatially align the component image information which is to be compounded contained in a discrete spatial compounding processor following the B mode and Doppler detector and processor. The resampler can also be located earlier in the processing sequence as shown in FIG. 9. In this embodiment the coherent Doppler samples produced by the beamformer 16 are stored in an optional Doppler sample memory 70. The stored Doppler samples from the different look directions are then resampled by the resampler 34 so that they are spatially aligned in a common coordinate system. The Doppler data is filtered by the wall filter 26 (which may be bypassed for tissue Doppler imaging) and the commonly aligned Doppler ensembles of each look direction are then processed by the Doppler processor 28 to produce Doppler power, velocity or variance estimates in the common coordinate system. Since the estimates are all referenced to a common coordinate system, they may be combined for spatial compounding without a further resampling step. In addition, the resampler can further provide scan conversion to the desired display format, obviating the need for subsequent scan conversion. The processing sequence of FIG. 9 is particularly useful when triangulating the true velocity vector at each point in the image as described above.

Figure 10A:
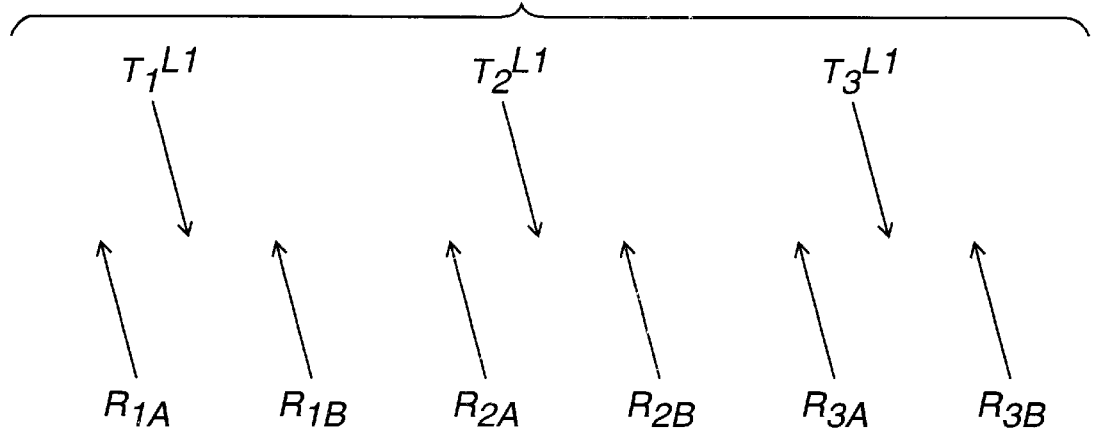
FIG. 10 illustrates a multiline acquisition sequence for Doppler signals which are to be spatially compounded.

A further benefit which may be obtained from Doppler spatial compounding is a reduction in multiline artifact. It is known that a banding artifact occurs in multiline due to the paired acquisition of lines. Referring to FIG. 10a, a first transmit pulse $T_1^{\angle 1}$ is transmitted in a first look direction and two scanlines $R_{1A}$ and $R_{1B}$ are simultaneously received by a multiline beamformer in response to the transmit pulse. As is well known, a multiline beamformer produces simultaneous receive lines from a single transmit pulse by applying different sets of steering delays to the received echo signals. In this example two lines are received in response to each transmit pulse, but three, four, or more lines may also be received and formed simultaneously. Transmission and reception across the image field continues in this manner, with transmit pulse $T_2^{\angle 1}$ producing multilines $R_{2A}$ and $R_{2B}$, and transmit pulse $T_3^{\angle 1}$ producing multilines $R_{3A}$ and $R_{3B}$. With 2:1 multiline, the entire image field can be scanned in half the time required to scan the same image field with conventional 1:1 transmission/reception at the same line spacing.

Figure 10B:
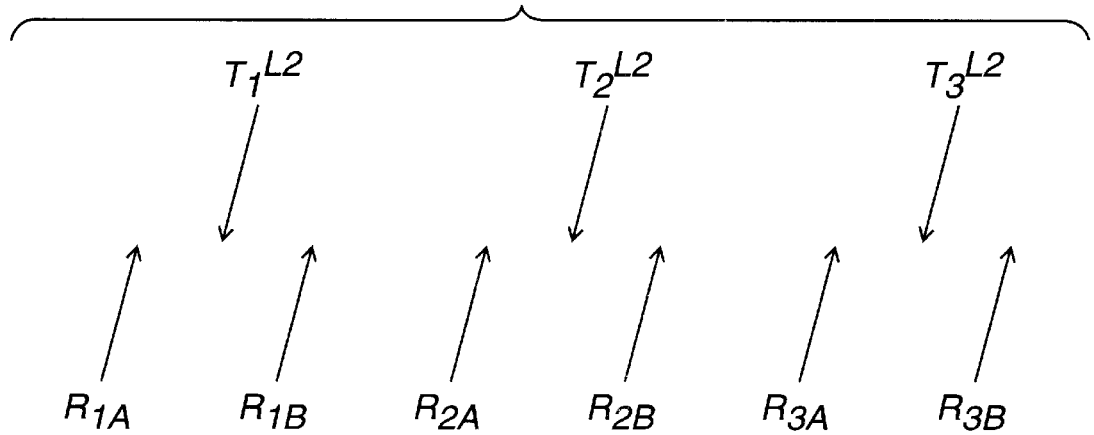
Figure 10C:
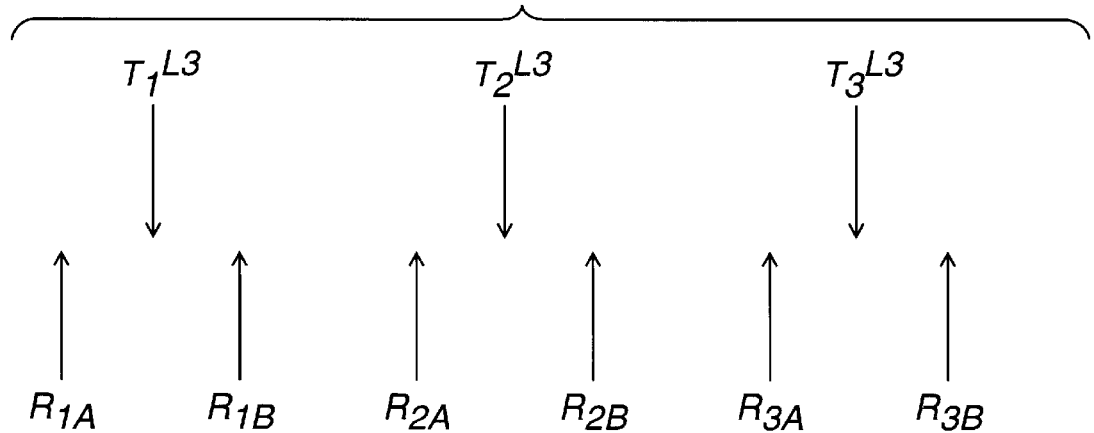

Continuation of the sequence of FIG. 10a results in acquisition of a component image frame at a first look direction $\angle 1$. FIGS. 10b and 10c illustrate the multiline acquisition of two additional component frames at look directions $\angle 2$ and $\angle 3$, respectively. Ensembles of scanlines are acquired at each look direction, then processed to produce component frames of flow or motion information at the differing look directions. In each component frame it is seen that a pair of adjacent lines such as $R_{1A}$ and $R_{1B}$ are received from a single transmit pulse. The flow or motion data produced from these concurrently formed lines will thus exhibit strong temporal correlation. However, adjacent lines $R_{1B}$ and $R_{2A}$ result from different transmit pulses ($T_1$ and $T_2$), and are not temporally correlated to the same degree as $R_{1A}$ and $R_{1B}$ or $R_{2A}$ and $R_{2B}$. This alternating temporal correlation across the image will manifest itself as a banding effect which is parallel to the scanlines, that is, parallel to the look (steering) direction. However, when the three component images of FIGS. 10a, 10b, and 10c are combined for spatial compounding, the banding effect is markedly reduced. Since each frame steering direction has a different banding pattern by virtue of being in a different look direction, the temporal or compounding filter will serve as a "multiline compounding" filter, blending and thereby removing these artifacts.

Figure 11:
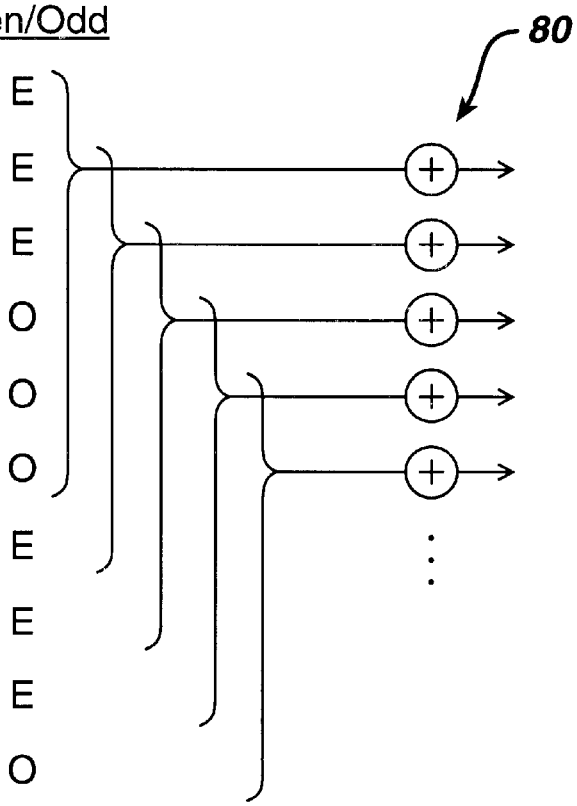
FIG. 11 illustrates an interlaced compound scanning technique for high frame rates of display.

In accordance with a further aspect of the present invention, high frame rates of display can be obtained by spatially dithered acquisition of Doppler image lines. For example, CPA images can be formed by acquiring spatially dithered (i.e., line interleaved) frames and compounding after power estimation and scan conversion to take advantage of a higher frame rate/ spatial resolution product. One can interleave CPA frames, each with beams spaced by X mm but offset from each other by X/2 mm. Referring to FIG. 11, a sequence of component frames numbered 1, 2, 3, 4, 5, 6, etc. is shown. Successive frames are steered in successively varying look directions as indicated in the Line Direction column by directions 0, 1, 2, 0, 1, 2, etc. In the first three frames only the even-numbered image lines are acquired at a lateral spacing of X mm. For instance, if a full image has 128 image lines, the first three frames would contain image lines 2, 4, 6, 8, etc. The next three frames 4, 5 and 6 would contain the interleaved odd-numbered image lines 1, 3, 5, 7, etc. which are separated by X/2 mm from the positions of the adjacent even-numbered lines. Since there are three different look directions in this example and two dithered frames (even lines and odd lines) are used to acquire all of the lines of one image, the component frames are compounded in groups of six. As the brackets and summers 80 indicate, the first six component frames are combined to form a first compound image. This first compound image. is formed of images of all three look directions and with both even-numbered and odd-numbered lines. A second compound image is formed from component frames 2 through 7. This second compound image is likewise composed of all three look directions and all image lines, but is produced at twice the frame rate of a full frame acquisition since only the even-numbered lines of the new frame are scanned. The third compound image is composed of component frames 3 through 8, the fourth compound image is composed of component frames 4 through 9, and so forth. The cyclical compounding of the different combination of steered and dithered frames will present the appearance of a completely detailed image when displayed at a reasonably high frame rate, an accomplishment which is made possible by the fact that each new component image can be acquired in half the normal time since only one-half of the scanlines of a full image are acquired. With multiline acquisition the time required to acquire a component frame can be further reduced. Thus, display frame rate is increased, but without the usual compromise of spatial resolution. The component frame compounding shown in FIG. 11 can be performed by a single component frame accumulator which subtracts the oldest frame and adds the newest as shown in FIG. 4, or by using multiple component frame accumulators as shown in FIG. 5 to produce spatially compounded images in real time.

What is claimed is:

1. An ultrasonic diagnostic imaging system which produces spatially compounded images of motion or flow comprising:
   a transmitter which transmits ultrasonic beams in a plurality of different look directions;
   a receiver which receives scanlines over a plurality of different look directions;
   a motion processor responsive to said received scanlines which estimates the motion of flow or moving tissue from the perspective of said different look directions; and
   a combiner which combines the motion information of said different look directions.

2. The ultrasonic diagnostic imaging system of claim 1, wherein said motion processor comprises a Doppler processor which computes a Doppler shift.

3. The ultrasonic diagnostic imaging system of claim 1, wherein said Doppler processor produces Doppler power or velocity estimates.

4. The ultrasonic diagnostic imaging system of claim 1, wherein said motion processor comprises a power motion imaging processor.

5. The ultrasonic diagnostic imaging system of claim 1, wherein said combiner comprises a temporal filter.

6. The ultrasonic diagnostic imaging system of claim 5, wherein said temporal filter comprises a nonrecursive temporal filter.

7. The ultrasonic diagnostic imaging system of claim 5, wherein said temporal filter comprises a recursive temporal filter.

8. The ultrasonic diagnostic imaging system of claim 5, wherein said temporal filter eliminates old frame data when new frame data is added to combined frame data of different look directions.

9. The ultrasonic diagnostic imaging system of claim 8, wherein said temporal filter comprises a frame accumulator.

10. The ultrasonic diagnostic imaging system of claim 5, wherein said temporal filter comprises a plurality of image accumulators which simultaneously accumulate temporally different combinations of image data of different look directions.

11. The ultrasonic diagnostic imaging system of claim 1, further comprising:
    a B mode processor responsive to received scanlines which produces B mode image data; and
    an image process responsive to said B mode processor and said combiner which produces a spatially compounded ultrasound image of B mode and motion information.

12. The ultrasonic diagnostic imaging system of claim 11, wherein said spatially compounded image comprises B mode information which is not spatially compounded and Doppler information which is spatially compounded.

13. The ultrasonic diagnostic imaging system of claim 11, wherein said spatially compounded image comprises B mode information which is spatially compounded and Doppler information which is not spatially compounded.

14. The ultrasonic diagnostic imaging system of claim 11, wherein said motion processor and said B mode processor process at least some common scanline data for the production of B mode image data and flow or motion estimates, respectively.

15. The ultrasonic diagnostic imaging system of claim 11, wherein said receiver receives scanlines for B mode processing and for motion processing in a time interleaved manner.

16. The ultrasonic diagnostic imaging system of claim 15, wherein received scanlines are time interleaved by time interleaving at least two of:
    B mode frame
    B mode look direction;
    B mode line number (origin along a transducer);
    Doppler frame
    Doppler look direction;
    Doppler line number (origin along a transducer);
    Doppler ensemble; and
    Doppler transmit pulse.

17. The ultrasonic diagnostic imaging system of claim 1, further comprising a scan converter responsive to said combiner which produces a spatially compounded image in a desired image format, wherein said combiner operates on estimate space information and said scan converter produces display space information.

18. The ultrasonic diagnostic imaging system of claim 1, further comprising a resampler responsive to said motion processor which resamples motion information to common spatial coordinates prior to spatial compounding.

19. The ultrasonic diagnostic imaging system of claim 18, wherein said resampler further comprises a scan converter.

20. The ultrasonic diagnostic imaging system of claim 1, further comprising a resampler responsive to scanline data and having an output coupled to said motion processor which resamples motion information to common spatial coordinates prior to motion processing and spatial compounding.

21. The ultrasonic diagnostic imaging system of claim 20, wherein said resampler further comprises a scan converter.

22. The ultrasonic diagnostic imaging system of claim 1, further comprising a Doppler sample memory having an input coupled to said receiver and an output coupled to said motion processor which stores ensembles of scanline data,
wherein said motion processor performs Doppler processing of ensembles of scanline data, and
wherein each of said ensembles comprises scanline data acquired from a single look direction.

23. The ultrasonic diagnostic imaging system of claim 1, wherein said receiver comprises a multiline receiver which receives multiple scanlines in response to a single transmit beam.

24. The ultrasonic diagnostic imaging system of claim 23, wherein said combiner further comprises means for reducing multiline temporal artifacts in ultrasonic images of tissue motion or flow.

25. The ultrasonic diagnostic imaging system of claim 1, wherein said receiver produces scanlines in which harmonic signal information is emphasized over fundamental signal information.

26. An ultrasonic diagnostic imaging system which produces spatially compounded images of motion or flow comprising:
a transmitter which transmits ultrasonic beams in a plurality of different look directions;
a receiver which receives scanlines over a plurality of different look directions;
a component frame store which stores component frames of different look directions; and
a combiner which combines component frames of said different look directions,
wherein respective ones of said component frames combined by said combiner comprise less than all of the scanlines of a complete image.

27. The ultrasonic diagnostic imaging system of claim 26, wherein said component frames comprise odd line number component frames and even line number component frames.

28. The ultrasonic diagnostic imaging system of claim 26, wherein said scanlines comprise at least one of B mode scanlines and Doppler scanlines.

29. A method for producing spatially compounded ultrasonic images of motion or flow comprising:
transmitting ultrasonic beams in a plurality of different look directions;
receiving scanlines over a plurality of different look directions;
processing received scanlines to produce estimates of the motion of flow or moving tissue from the perspective of said different look directions; and
combining the motion information of said different look directions.

30. The method of claim 29, wherein said step of processing comprises computing a Doppler shift.

31. The method of claim 29, wherein said step of processing produces Doppler power or velocity estimates.

32. The method of claim 29, wherein said step of combining comprises temporal filtering.

33. The method of claim 32, wherein said step of temporal filtering comprises nonrecursively temporal filtering.

34. The method of claim 32, wherein said step of temporal filtering comprises recursively temporal filtering.

35. The method of claim 32, wherein said step of temporal filtering comprises eliminating old frame data when new frame data is added to combined frame data of different look directions.

36. The method of claim 32, wherein said step of temporal filtering comprises simultaneously accumulating temporally different combinations of image data of different look directions.

37. The method of claim 29, further comprising the steps of:
B mode processing received scanlines to produce B mode image data; and
image processing B mode and motion image data to produce a spatially compounded ultrasound image of B mode and motion information.

38. The method of claim 37, wherein said spatially compounded image comprises B mode information which is not spatially compounded and Doppler information which is spatially compounded.

39. The method of claim 37, wherein said spatially compounded image comprises B mode information which is spatially compounded and Doppler information which is not spatially compounded.

40. The method of claim 37, wherein said step of receiving comprises receiving scanlines for B mode processing and for motion processing in a time interleaved manner.

41. The method of claim 40, wherein received scanlines are time interleaved by time interleaving at least two of:
B mode frame
B mode look direction;
B mode line number (origin along a transducer);
Doppler frame
Doppler look direction;
Doppler line number (origin along a transducer);
Doppler ensemble; and
Doppler transmit pulse.

42. The method of claim 29, further comprising the step of scan converting combined motion information to produce a spatially compounded image in a desired image form at,
wherein said step of combining operates on estimate space information and said step of scan converting produces display space information.

43. The method of claim 29, further comprising the step of resampling motion information to common spatial coordinates prior to the step of combining.

44. The method of claim 29, further comprising the step of resampling motion information to display coordinates prior to the step of combining.

45. The method of claim 29, further comprising the step of resampling motion information to common spatial coordinates prior to the steps of processing and combining.

46. The method of claim 29, further comprising the step of resampling motion information to common spatial coordinates prior to the steps of processing and combining.

47. The method of claim 29, further comprising the step of storing ensembles of scanline data, wherein said processing step performs Doppler processing of ensembles of scanline data, and wherein each of said ensembles comprises scanline data acquired from a single look direction.

48. The method of claim 29, wherein said step of receiving comprises receiving multiple scanlines in response to a single transmit beam.

49. The method of claim 48, wherein said multiple scanlines are received from different look directions.

50. The method of claim 48, wherein said step of combining further comprises reducing multiline temporal artifacts in ultrasonic images of tissue motion or flow.

51. A method for producing spatially compounded ultrasonic images of motion or flow comprising:

transmitting ultrasonic beams in a plurality of different look directions;

receiving scanlines over a plurality of different look directions;

storing component frames of different look directions; and combining component frames of said different look directions, wherein respective ones of said component frames combined by said combining step comprise less than all of the scanlines of a complete image.

52. The method of claim 51, wherein said component frames comprise odd line number component frames and even line number component frames.

53. The method of claim 51, wherein said scanlines comprise at least one of B mode scanlines and Doppler scanlines.

* * * * *